July 15, 1958 C. S. LERCH, JR., ET AL 2,843,734

SIGNAL SEEKING RADIO RECEIVER

Filed Feb. 29, 1956

MICHAEL SLAVIN
BASIL P. HOOTEN, JR.
CHARLES S. LERCH, JR.
FREDERICK E. CHURCHILL
CHIH CHI HSU
*INVENTORS*

BY Killman and Kerst
*ATTORNEYS*

United States Patent Office 2,843,734

Patented July 15, 1958

2,843,734

SIGNAL SEEKING RADIO RECEIVER

Charles S. Lerch, Jr., Michael Slavin, Basil P. Hooten, Jr., Frederick E. Churchill, and Chih Chi Hsu, Baltimore, Md., assignors to Bendix Aviation Corporation, Towson, Md., a corporation of Delaware Application February 29, 1956, Serial No. 568,510

14 Claims. (Cl. 250—20)

Figures 1, 2:
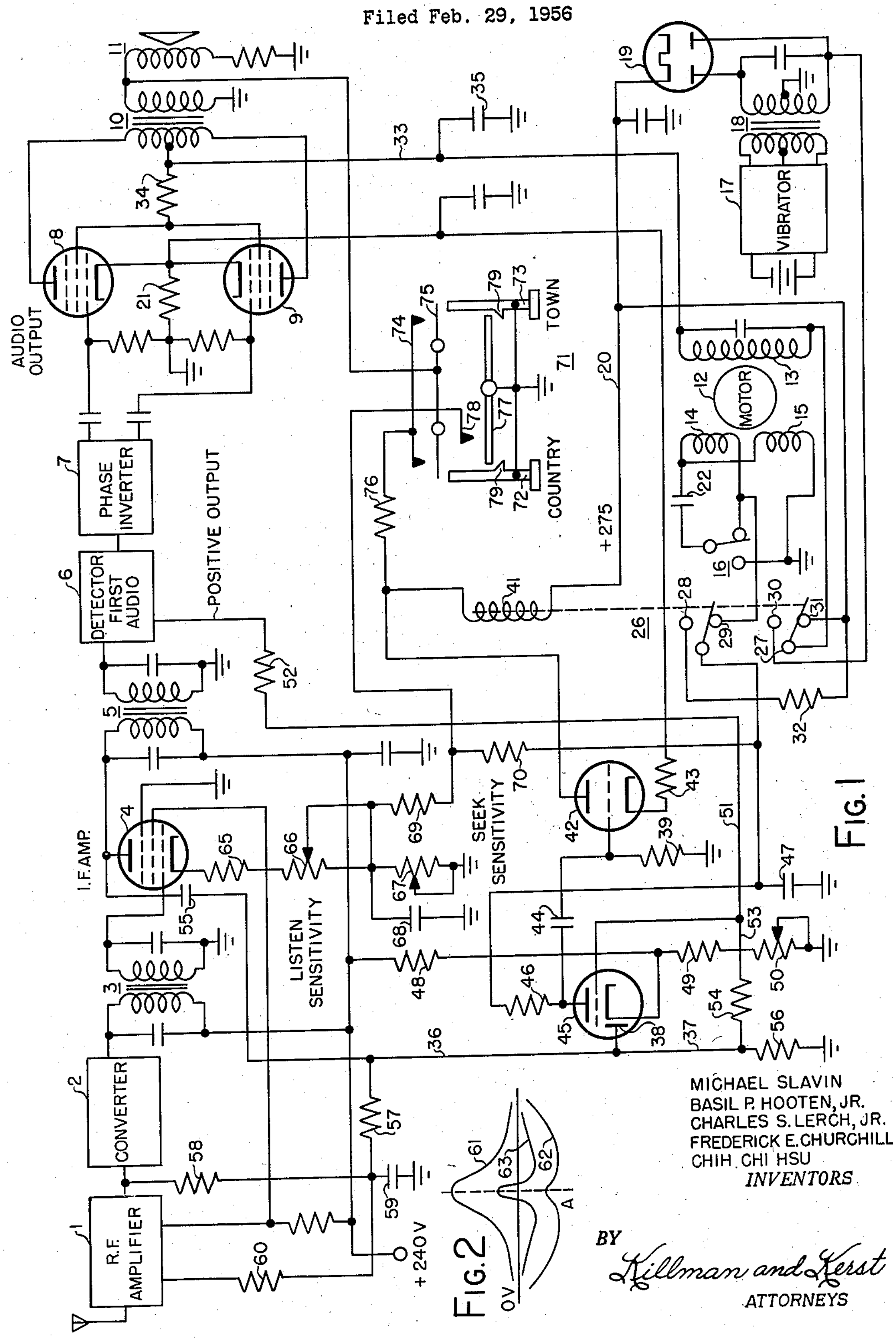

This invention relates to a radio receiver circuit of the signal seeking variety which is particularly well adapted for automobile use. In order to relieve the operator of a touring automobile from the task of tuning a receiver across the dial in search of signals of unknown frequency and effecting precise tuning to such a signal when found, signal seeking receivers have come into use. Their use has, however, been attended with certain difficulties. The signal seeking action requires a tuning motor which may add to the load on the power supply. This added drain on the power supply can be a serious matter in the event of repeated operation of the signal seeking mechanism by a child or its operation, by anyone, in a low sensitivity state in a region where signal strengths are too low to halt the tuning action. In such a situation the operator may forget that the tuning action is operating, with resulting damage to tuning motor or power supply.

To avoid the extra load, means for interrupting the application of supply voltage to the audio output stage, coincident with the initiation of the tuning operation, have been provided. This requires a relay contact.

Another relay contact to disable the relay control tube at the termination of the tuning operation has been necessary to avoid initiation of signal seeking upon the temporary loss of a signal due to passage through a bridge or tunnel.

Relay contacts constitute not only a major item of expense but are also a major source of trouble in signal seeking receivers and it is an object of this invention to eliminate a contact from the tuning motor control relay by utilizing a single contact to mute the receiver during tuning and to deactivate the relay control tube during listening.

It has also been found desirable in signal seeking receivers for automobile use, to provide for two available levels of receiver sensitivity for the seeking operation. In urban areas, where there are local stations and strong signals, a level of sensitivity lower than the normal receiver sensitivity during listening is required. In rural areas, where signals are of lower strength the normal receiver sensitivity level for listening purposes has been retained. This has been done by the provision of a relay operated switch to short out a portion of the I. F. biasing resistance for the high sensitivity level. This change from low to high sensitivity normally results in objectionable surges in the AGC and audio systems.

It is another object of the invention to avoid such surges.

Another difficulty which has been encountered is that of providing an economical means for accurately stopping the tuning motor at the point of resonance with an intercepted signal.

It is a further object of the invention to provide a means operable upon the deenergizing of the tuning motor control relay to arrest the rotation of the tuning motor within a fraction of a revolution of its motion.

It is a still further object of the invention to reduce the cost of the high voltage supply filter over the cost of conventional filters.

These and other objects and advantages of the invention are realized by a receiver circuit in which a motor tuning drive is energized by the actuation of pushbutton means, one pushbutton being provided for use in rural locations and one for use in urban sections. These buttons, referred to herein as "country" and "town" buttons, respectively, actuate the motor drive relay, mute the speaker and switch the receiver to a desired sensitivity level for the seeking operation. Actuation of either of the buttons also activates a trigger amplifier which compares positive and negative inputs from appropriate portions of the signal translation path of the receiver, to deactivate the relay upon the attainment of resonance with a received signal. An arrangement is provided whereby, upon the deactivation of the relay, D. C. is applied to the field winding of the tuning motor to insure its quick stoppage by virtue of heavy currents induced in the motor windings armature and interacting with the field to retard further rotation. Even this rate of stopping would not be quick enough for the purposes of this mechanism and in order to further decrease the stopping time of the tuning motor there is applied to the shading coils thereof the charge of a condenser in a sense to aid the stopping action set up therein by the initiation of the D. C. in the field winding. This impulse thus supplies a force which opposes continued rotation of the motor and has the effect of stopping it within a fraction of a revolution. This same condenser charge is applied to the sensitivity determining biasing network of the receiver each time the tuning relay is actuated by the "town" button and it serves to provide a smooth transition when the sensitivity is being changed from a low to a high level, thus avoiding undesirable surges in the audio and AGC systems.

The same relay contacts that apply D. C. to the motor for stopping purposes also simultaneously apply it to the audio output stage as supply voltage. These contacts, when the relay is actuated, substitute A. C. voltage on the motor windings and disable the audio output stage. The relay control tube utilizes the cathode voltage of the audio output stage as bias voltage.

In the drawing, Fig. 1 is a schematic circuit diagram of a radio receiver embodying the invention; and Fig. 2 is a related group of curves representing voltages existing in the circuit of Fig. 1 during the tuning operation.

The receiver comprises an R. F. amplifier 1 and a converter 2 of conventional form. The output of the converter is coupled by way of a transformer 3 to an I. F. amplifier 4, shown as a pentode. The output of the I. F. amplifier is coupled by a transformer 5 to a conventional detector and first audio amplifier circuit 6 followed by a phase inverter stage 7. The output of the latter is applied in push-pull fashion to a pair of pentodes 8, 9 comprising the audio output stage and having a common cathode resistor 21. Coupled to this stage by a transformer 10 is a conventional loud speaker circuit 11.

A motor 12 is provided for driving conventional ganged capacitors or inductive tuning means which are not shown. The motor is provided with a field coil 13 and a pair of shading coils 14 and 15 (each coil usually being divided), for controlling its direction of rotation. A reversing switch 16 is provided in the shading coil circuit, which is operated by limit stops in a known fashion to alternate a connection of the phasing condenser 22, or a short circuiting connection, across coils 14 and 15 at the limits of travel of the tuning elements.

The power supply for the motor and the receiver in general, is shown as including a vibrator 17 and a transformer 18, the output of which is applied to a rectifier 19 having its cathodes connected to a positive bus 20 which is indicated as carrying a voltage of 275 volts, and is also applied to the motor winding 13 via relay contacts 27—31 during the signal seeking operation.

There are provided, in conjunction with the motor, a pair of single pole, double throw switches 26 and 27, simultaneously operated by a relay in a manner to be described later. The switch 26 has a pair of fixed contact elements 28 and 29. The contact element 29 is connected to one side of the coil 14. The switch 27 has a pair of fixed contact elements 30 and 31. The contact element 28 of switch 26 is connected by way of a resistor 32 to contact element 31 and to the bus 20. The contact element 30 is connected to the secondary of transformer 18. The switch blade of switch 27 is connected to one side of the field coil 13, the other side of which is connected by way of a conductor 33 to the mid-point of the primary of transformer 10 and also by way of a resistor 34 to the screen grids of tubes 8 and 9. The conductor 33 is connected to ground by way of a capacitor 35.

Switches 26 and 27 are actuated by means of a relay coil 41, one end of which is connected to the bus 20 and the other end to the plate of a tube 42 shown as a triode. The cathode of tube 42 is connected by way of a resistor 43 to the cathodes of tubes 8 and 9.

The grid of tube 42 is connected by way of capacitor 44 to the plate of an AGC rectifier and trigger amplifier tube 45, shown as a diode-triode, and by way of a resistor 39 to ground. The plate of tube 45 is also connected by way of a resistor 46 to the switch blade of switch 26 and to ground by way of a capacitor 47. The cathode of this tube is connected to a voltage divider comprising resistors 48, 49 and 50 extending between a source of positive voltage indicated as +240 volts and ground. The grid of this tube is connected to a conductor 51 which is connected by way of a resistor 52 to a positive output point of the detector 6. The grid is also connected by way of a conductor 53, a resistor 54 and a conductor 37 to the auxiliary anode 38 of tube 45, which in turn is coupled by a conductor 36 and a capacitor 55 to the plate of I. F. amplifier 4. The end of resistor 54 (connected to auxiliary anode 38) is also grounded through a resistor 56 and connected by conductor 37 to a resistor 57. The remaining end of resistor 57 is connected by way of a resistor 58 to the input of converter 2. It is also connected to ground through a capacitor 59 and to the input of R. F. amplifier 1 through a resistor 60.

The sensitivity of the receiver is governed by a network of resistors and a capacitor in the cathode circuit of the I. F. amplifier 4. This network comprises a serial string consisting of resistor 65, potentiometer 66 and potentiometer 67, the remaining terminal of the latter being grounded. The junction of potentiometers 66 and 67 is connected to ground through a capacitor 68 and to a pair of serially connected resistors 69 and 70, the remaining terminal of resistor 70 being connected to the junction of the switch, the blade of switch 26 and condenser 47.

The signal seeking activities of the receiver are controlled by a pushbutton switch 71 comprising a pushbutton 72 for country use and a pushbutton 73 for town use. These buttons are both connected to a voltage reference plane such as ground and are biased by means not shown to their unactivated positions. The switch also comprises a pair of leaf spring contact members 74 and 75. Member 74 is connected by way of resistor 76 to the junction of one terminal of relay coil 41 and the anode of tube 42. Member 75 is connected to the ungrounded terminal of the secondary of audio output transformer 10. There is also provided a grounded lever 77 pivoted at its mid-point and frictionally held in any position to which it is displaced. One end of the lever 77 may be moved into contact with a contact element 78 which is connected to the junction of resistors 69 and 70. The pushbuttons 72 and 73 are each provided with an abutment 79 which engages a respective end of the lever 77 when that pushbutton is actuated to its innermost position. The contact element 78 is so located with respect to the lever 77 that they are brought into contacting relationship when the pushbutton 72 is pressed inwardly and are released from that relationship only by inward movement of the pushbutton 73.

In the receiver circuit, as shown in the drawing, the relay 41 is unenergized and the switches 26 and 27 are in their position of rest with their switch blades in contact with contact elements 29 and 31, respectively. The pushbuttons 72 and 73 are also in their unactivated positions. This is the listening condition of the receiver which exists when it is tuned to a desired signal or is not in use.

In this condition of the circuit the sensitivity determining cathode circuit of the amplifier 4 includes the resistors mentioned above and also, by way of the switch blade of switch 26, contact 29 and its connection to the shading coils 14 and 15 of the motor 12, includes the impedance of those coils. Since the shading coils will have dissipated any charge formerly acquired by the capacitor 47, there will be no sensitivity affecting potential applied across the string of resistors 67, 69, 70. The tubes 8 and 9 have applied to their anodes voltage from the 275 volt source, by way of the conductor 33, the field coil 13 of the motor, the switch blade of switch 27 and contact element 31 of that switch. With the audio output tubes 8 and 9 in operation, a positive voltage of substantially 18 volts will be present on their cathodes and this is applied to the cathode of tube 42 through resistor 43, maintaining that tube in a non-conductive state. With the tube 42 in this condition the relay 41 is in its unenergized condition. The tube 45 is also in a non-conductive state since its cathode is held at a positive voltage determined by the values of resistors 48, 49 and 50, while its anode is connected to ground by way of resistor 46, the switch blade of switch 26, the contact element 29 of that switch and the impedance of the shading coils 14 and 15 of the motor 12.

If now the receiver is located in an urban area and it is desired to initiate a signal seeking tuning action, the town button 73 is pressed inwardly. This will have the effect of first short-circuiting the secondary of the audio output transformer 10 through the blade 75 and the button 73. As the button continues its inward travel the blade 75 will make contact with the blade 74, thus connecting that blade to ground through the button 73. This will complete a circuit from the 275 volt bus 20 through the relay coil 41 and the resistor 76 to ground and the relay will be energized, raising the switch blade of switch 26 into contact with the element 28 and the switch blade of switch 27 into contact with the element 30.

The new position of the switch 27 will apply alternating current from the secondary of transformer 18 to the field coil 13 and the D. C. voltage previously applied to the plates and screen grids of the audio output tubes 8 and 9 will be removed, the circuit from the secondary of the transformer 18 through the switch 27 and field coil 13 being now completed by way of the capacitor 35 to ground.

This will render the tubes 8 and 9 non-conductive and the 18 volts previously present on the cathodes of these tubes will now fall to ground level. The tube 42 will thereupon become conductive and maintain the relay 41 in an activated state after release of the button 73.

The motor 12 will now begin to operate, the direction of its rotation being determined by the position of the switch 16.

As the motor continues to rotate, and tuning proceeds, as each signal is encountered and passed there will be applied to the grid of tube 45 a pair of voltages which are represented by curves 61 and 62 of Fig. 2. Voltage 62 represents the envelope of the voltage appearing across the primary of transformer 5 as present in the output of amplifier 4. It will be noted that this voltage is negative, becoming more negative as the point of resonance of an encountered signal, represented by the dashed line A, is approached. This voltage curve displays a small positive hump at the point A, however, which is characteristic of the primary voltage of a double-tuned transformer at the point of resonance with an applied voltage when the coupling is approximately transitional, as first described in Figs. 3 and 4 of U. S. Patent No. 2,096,874 to Beers, and more fully disclosed in U. S. Patent No. 2,652,486 to Guyton. The curve 61 represents the voltage at the positive output of detector 6, applied to the grid of tube 45 by way of resistor 52 and conductor 51. It will be noted that this voltage is positive, increasing in value as the point of resonance is neared, to provide a prominent peak having its maximum amplitude at point A, as also set forth in the above mentioned U. S. patent to Beers.

The curve 63 represents the combined values of these voltages which are applied to the grid of tube 45. It will be noted that this voltage has a sharply defined positive going peak in the vicinity of resonance.

As tuning progresses and nears the point A, the bias on tube 45 will be overcome and the tube will finally conduct near the peak of the waveform 63. This will have the effect of cutting off the tube 42, thus interrupting current flow through the relay coil 41 and causing that relay to again become deenergized. As this occurs and the switches 26 and 27 revert to their positions, as shown in the drawing, the A. C. voltage from the transformer 18 is removed from the field coil of the motor, and the D. C. voltage from the bus 20 is applied thereto. The application of this voltage results in the building up of heavy currents in the armature of the motor which tend to bring it to a quick stop. This effect is aided by the fact that the condenser 47, which has acquired a charge from bus 20 through resistor 32 and switch 26 during the period of relay closure, now discharges through the shading coils 14 and 15. The connections of these coils are such that regardless of the position of the reversing switch 16, the discharge of the capacitor 47 will produce a surge of current through the coils 14 and 15 which will resist the motion of the motor and assist in bringing it to a quick stop. This will result in the accurate positioning of the tuning element at the point of resonance with the intercepted signal. Since the extra bias across resistor 67 is proportional to the potential across capacitor 47, it declines rapidly as capacitor 47 is discharged, but smoothly rather than abruptly, thus avoiding the objectionable surges in the AGC and audio systems when the transition is made from low to high sensitivity, which are experienced in the use of prior art systems.

The "stopping current" through the motor field coil 13 charges capacitor 35 at a relatively slow rate so that by the time the voltage supplied to the output tubes 8 and 9 is high enough to permit conduction of those tubes, the voltages throughout the receiver have for all practical purposes reached their quiescent levels. This has the desired effect of completely eliminating any unwanted "transient noises" from the speaker when the receiver stops on a signal.

As tubes 8 and 9 begin to conduct a voltage is developed across their cathode resistor 21 which is applied to the cathode of tube 42 through resistor 43 and which is of sufficient amplitude to hold tube 42 in a cut-off condition.

When it is desired to initiate the signal seeking operation in a rural location the country pushbutton 72 is utilized. The operation of this button is the same as that described for the button 73, except that its boss 79 engages the left-hand end of lever 77 and brings it into contact with the contact element 78. Lever 77 will remain in this position as the button 72 returns to its unactivated position and will continue to occupy the same position until a subsequent action of the pushbutton 73 breaks the contact.

The result of the establishment of this contact is the grounding of the junction of the resistors 69 and 70, so that there will be no change in the sensitivity of the receiver during the ensuing signal seeking action. This result arises from the diversion of the current flow which otherwise would take place from bus 20 through resistor 32 and resistors 70, 69 and 67 to a flow through resistor 70, and thence to ground through contact member 78 and lever 77. The bias voltage which was generated across resistor 67 during the signal seeking action initiated by activation of pushbutton 73 thus fails to appear, and the signal seeking operation is consequently carried out at the same sensitivity which is used for listening.

The I. F. amplifier tube 4 is a sharp cut-off pentode. Because of this fact only a small value of current flow through resistor 67 in addition to that drawn by the tube is required to reduce the gain of the tube by as much as 30 db. Since the resistor 67 is of relatively low value and is by-passed by the condenser 68 the flow of cathode current through the resistor has only a slight effect on the gain of the tube. This permits adjustment of the seek sensitivity for town seeking by means of the variable resistor 67 without having to readjust the listening sensitivity by means of the resistor 66.

The by-passing of resistor 67 by capacitor 68 enables change of sensitivity during seeking to be accomplished entirely by changing the bias voltage across resistor 67 instead of employing a combination of bias and degeneration such as is involved in changing the listen sensitivity by adjustment of resistor 66.

Prior signal seeking receivers have suffered from an inability to "get away" from a strong signal when the seek bars are activated with a single quick push. This receiver does not have this deficiency because of two actions which occur immediately after either seek bar is actuated.

When the relay 41 is energized the switch blade of 26 moves to contact 28. This allows condenser 47 to become charged by a current which flows from bus 20 through resistor 32. Since the charge on condenser 47 rises exponentially the plate supply voltage for tube 45 does not reach its final value until the receiver has "left the signal" to which it was tuned. The delay of tube 45 plate voltage is further accomplished by the time taken to charge condenser 44 through resistor 46 and the grid resistor 39 of tube 42. The charging current also develops a decaying positive charge across the aforementioned grid resistor.

These charging times have been selected so that as soon as the receiver is "away from the signal" tubes 45 and 42 operate at normal gain so as not to miss nearby signals.

What is claimed is:

1. In a signal seeking radio receiver having an audio output amplifier comprising at least one vacuum tube having a plate and a cathode, a source of direct current voltage, a seeking switch, a relay operated switch, a first contact on said relay operated switch, means connecting said direct current power supply to said audio output amplifier in a manner to provide plate supply voltage thereto when said relay operated switch is closed by way of said first contact, a second contact on said relay operated switch, said source of direct current voltage being disconnected from said amplifier when said switch is closed by way of said second contact, said relay actuated switch being closed by way of said first contact when said relay is not energized, a relay control tube having a plate and a cathode, means connecting the cathodes of said control tube and said tube of said audio output amplifier, means connecting the plate of said control tube to said source of direct current voltage by way of the relay of said relay operated switch, said control tube, by virtue of said connection between said cathodes, being in a non-conducting state when said receiver is in operation and said seeking switch is not actuated, and means operated by actuation of said seeking switch to connect said source of direct current voltage to ground through said relay; whereby said relay is energized, said relay operated switch is closed by way of said second contact, said audio amplifier is rendered non-conductive by the disconnection of said source of direct current voltage therefrom and said control tube is rendered conductive by virtue of the connection between said cathodes and maintains said relay in an energized state.

2. In a signal seeking radio receiver having an audio output amplifier comprising at least one vacuum tube having a plate and a cathode, a source of direct current voltage, a seeking switch, a relay operated switch, a first contact on said relay operated switch, means connecting said direct current power supply to said audio output amplifier in a manner to provide plate supply voltage thereto when said relay operated switch is closed by way of said first contact, a second contact on said relay operated switch, said source of direct current voltage being disconnected from said amplifier when said switch is closed by way of said second contact, said relay actuated switch being closed by way of said first contact when said relay is not energized, a relay control tube having a plate and a cathode, means connecting the cathodes of said control tube and said tube of said audio output amplifier, means connecting the plate of said control tube to said source of direct current voltage by way of the relay of said relay operated switch, said control tube, by virtue of said connection between said cathodes, being in a non-conducting state when said receiver is in operation and said seeking switch is not actuated, means operated by actuation of said seeking switch to connect said source of direct current voltage to ground through said relay; whereby said relay is energized, said relay operated switch is closed by way of said second contact, said audio amplifier is rendered non-conductive by the disconnection of said source of direct current voltage therefrom and said control tube is rendered conductive by virtue of the connection between said cathodes and maintains said relay in an energized state; and means responsive to the reception of a signal by said receiver to render said control tube non-conductive.

3. In a signal seeking radio receiver having an audio output amplifier comprising at least one vacuum tube having a plate and a cathode, a source of direct current voltage, a seeking switch, a relay, a switch operated by said relay and having a first position when said relay is deenergized and a second position when said relay is energized, connecting means between said source of direct current voltage and said plate of said audio output amplifier tube, said connecting means including said relay operated switch and being completed only when said switch is in said first position, a relay control tube having a plate and a cathode, means connecting the cathodes of said relay control tube and said amplifier tube, means connecting the plate of said control tube to said source of direct current voltage by way of said relay, said control tube by virtue of said connection between said cathodes, being in a non-conducting state when said receiver is in operation and said seeking switch is not actuated, and means operated by actuation of said seeking switch to connect said source of direct current voltage to ground through said relay; whereby said relay is energized, said audio amplifier is rendered non-conductive by the disconnection of said source of direct current voltage therefrom and said control tube is rendered conductive by virtue of the connection between said cathodes and maintains said relay in an energized state.

4. In a signal seeking radio receiver having an audio output amplifier comprising at least one vacuum tube having a plate and a cathode, a source of direct current voltage, a seeking switch, a relay, a switch operated by said relay and having a first position when said relay is deenergized and a second position when said relay is energized, connecting means between said source of direct current voltage and said plate of said audio output amplifier tube, said connecting means including said relay operated switch and being completed only when said switch is in said first position, a relay control tube having a plate, a control grid and a cathode, means connecting the cathodes of said relay control tube and said amplifier tube, means connecting the plate of said control tube to said source of direct current voltage by way of said relay, said control tube, by virtue of said connection between said cathodes, being in a non-conducting state when said receiver is in operation and said seeking switch is not actuated, means operated by actuation of said seeking switch to connect said source of direct current voltage to ground through said relay; whereby said relay is energized, said audio amplifier is rendered non-conductive by the disconnection of said source of direct current voltage therefrom and said control tube is rendered conductive by virtue of the connection between said cathodes and maintains said relay in an energized state, and means responsive to the reception of a signal by said receiver to apply a negative potential to said control grid sufficient in magnitude to render said control tube non-conducting, thereby deenergizing said relay.

5. In a signal seeking radio receiver, a source of direct current voltage, a source of alternating current voltage, a seeking switch, a tuning motor, a relay, a switch operated by said relay and having a first position when said relay is unenergized and a second position when said relay is energized, a field coil for said motor, a pair of shading coils for said motor, means applying energy from said direct current voltage source to said field coil when said relay operated switch is in said first position, means applying energy from said alternating current voltage source to said field coil when said relay operated switch is in said second position, means maintaining said relay deenergized while said seeking switch is not actuated, means responsive to the actuation of said seeking switch to energize said relay and maintain it in an energized condition until a signal is received by said receiver, a capacitor, means to charge said capacitor while said relay is in said second position, and means applying said charge to said shading coils when said relay operated switch is in said first position, said shading coils being so connected that the application of said charge thereto produces therein a surge of current having such a direction of flow as to resist the motion of said tuning motor.

6. In a signal seeking receiver, a source of direct current voltage, a source of alternating current voltage, a seeking switch, a tuning motor, said motor having a field coil and a pair of shading coils, a relay, a switch operated by said relay and having a first position when said relay is unenergized and a second position when said relay is energized, means applying energy from said direct current voltage source to said field coil by way of said relay operated switch when said relay operated switch is in said first position, means applying energy from said alternating current voltage source to said field coil by way of said relay operated switch when said relay operated switch is in said second position, a vacuum tube having an input circuit, a capacitor, means responsive to the actuation of said seeking switch to energize said relay, means responsive to the reception of a signal by said receiver to apply to said input circuit a voltage which renders said vacuum tube conductive only when said receiver is tuned substantially to resonance with said signal, means applying the charge on said capacitor to said shading coils by way of said relay operated switch when said relay operated switch is in said first position, said shading coils being so connected that the application of said charge thereto produces therein a surge of current having such a direction of flow as to resist the motion of said tuning motor, and means connecting said capacitor to said source of direct current voltage, through said relay operated switch when said relay operated switch is in said second position.

7. In a signal seeking receiver, a source of direct current voltage, a source of alternating current voltage, a seeking switch, a tuning motor, said motor having a field coil and a pair of shading coils, a relay, a control tube for said relay, said control tube being normally non-conducting, a switch operated by said relay and having a first position when said relay is unenergized and a second position when said relay is energized, means applying energy from said direct current voltage source to said field coil by way of said relay operated switch when said relay operated switch is in said first position, means applying energy from said alternating current voltage source to said field coil by way of said relay operated switch when said relay operated switch is in said second position, a vacuum tube having an input circuit and an output circuit, means applying the output of said vacuum tube to the input of said control tube, a capacitor, means responsive to the actuation of said seeking switch to energize said relay, and to render said control tube conductive, means applying the output of said control tube to said relay to maintain its energization, means responsive to the reception of a signal by said receiver to apply to said input circuit a voltage which renders said vacuum tube conductive only when said receiver is tuned substantially to resonance with said signal, said control tube being rendered non-conductive by the conduction of said vacuum tube, means applying the charge on said capacitor to said shading coils by way of said relay operated switch when said relay operated switch is in said first position. said shading coils being so connected that the application of said charge thereto produces therein a surge of current having such a direction of flow as to resist the motion of said tuning motor, and means connecting said capacitor to said source of direct current voltage, through said relay operated switch when said relay operated switch is in said second position.

8. In a signal seeking radio receiver, an audio output amplifier, audio energy transducing means, means coupling the output of said amplifier to said transducing means, a relay, a source of direct current voltage, a relay control tube having an output circuit connected to said source of direct current voltage by way of said relay, said relay being shiftable between a first and a second energy state by said relay control tube, a seeking switch comprising a first and a second manually operable actuator, means conductively connecting said actuators to a reference voltage plane, a first contact member conductively connected to the junction of said output circuit of said relay control tube and said relay, a second contact member so positioned as to be movable by the operation of either of said actuators into contact with said first contact member, means conductively connecting said second contact member across the output of said coupling means, an intermediate frequency amplifier, a biasing circuit for said intermediate frequency amplifier comprising a pair of serially connected resistors, a capacitor coupling the free terminal of said pair of resistors to said reference voltage plane, a third contact member forming a part of said seeking switch, said third contact member having the form of a lever pivoted about its mid-point and constrained to remain in any position to which it is moved, said third contact member being conductively connected to said voltage reference plane, a fourth contact member, said fourth contact member being fixed and being conductively connected to the junction of said serially connected resistors, a third resistor, means responsive to the said first energy state of said relay to connect through said third resistor the junction of said capacitor with said terminal of said resistors to a terminal of said source of direct current having a polarity such as to increase the bias of said amplifier, means responsive to the said second energy state of said relay to connect said junction to said voltage reference plane, an abutment on each of said actuators positioned to engage a respective end of said third contact member when said actuator is operated, said fourth contact member being so positioned that one end of said third contact member makes contact therewith when it is moved by the operation of its respective actuator, said contact between said third contact member and said fourth contact member being maintained until actuation of the other actuator.

9. In a signal seeking radio receiver, a source of direct current voltage, an intermediate frequency amplifier, a biasing circuit for said intermediate frequency amplifier comprising a pair of serially connected resistors, a capacitor connecting the free terminal of said pair of resistors to a voltage reference plane, a third resistor, a seeking switch having a pair of actuators, means responsive to the movement of either of said actuators to connect through said third resistor the junction of said capacitor with said terminal of said resistors to a terminal of said source of direct current voltage having a polarity such as to increase the bias of said amplifier, means responsive to the tuning of said receiver to the frequency of a signal source to connect said junction to said voltage reference plane, and means responsive to the movement of a selected one of said actuators to connect the junction of said pair of resistors to said voltage reference plane.

10. In a signal seeking radio receiver, a source of direct current voltage, an intermediate frequency amplifier, a biasing circuit for said amplifier comprising at least one resistor, a capacitor connecting said resistor to a voltage reference plane, a tuning motor, a field coil for said motor, shading coils for said motor, means responsive to the initiation of a signal seeking operation to connect the junction of said resistor and said capacitor to a terminal of said source of direct current voltage having a polarity such as to increase the bias on said amplifier, the last named means including a resistor in series with said junction and said terminal, and means responsive to the tuning of said receiver to the frequency of a signal source to connect said junction to said voltage reference plane by way of said shading coils and to connect said terminal to said field coil.

11. In a signal seeking radio receiver, a source of direct current voltage, an intermediate frequency amplifier, a biasing circuit for said amplifier comprising at least one resistor, a capacitor connecting said resistor to a voltage reference plane, a second resistor, a tuning motor, a field coil for said motor, shading coils for said motor, a switch having two positions, in the first of which it connects the junction of said resistor and capacitor to said voltage reference plane by way of said shading coils and connects said source of direct current voltage to said field coil and in the second of which it connects said junction by way of said second resistor to a terminal of said source of direct current voltage having a polarity such as to increase the bias of said amplifier, a relay controlling said switch, said relay causing said switch to occupy said first position when it is in a first state of energization and said second position when it is in a second state of energization, a seeking switch actuatable to initiate the signal seeking tuning action of said receiver, means operable upon the actuation of said seeking switch to place said relay in said first state of energization and means operable when said receiver becomes tuned to the frequency of a signal source to place said relay in said second state of energization.

12. In a signal seeking radio receiver having an audio output stage, a seeking switch, a tuning motor, a field coil for said motor, a relay shiftable into a first state of energization by the actuation of said seeking switch, a source of direct current voltage, a switch actuated by said relay, means connecting said source of direct current voltage by way of said relay actuated switch and said field coil to said audio output stage as plate supply voltage, said connections being made only when said relay is in a second state of energization, and a capacitor connecting the junction of said field coil and said audio output stage to a voltage reference plane, a source of alternating current voltage, and means connecting said source of alternating current voltage by way of said relay actuated switch through said field coil to said audio output stage, the last named connection being made only when said relay is in said first state of energization, the value of the capacitance of said capacitor being such that it presents a low impedance to the frequency of said alternating current voltage, and means shifting said relay into said first state of energization when said receiver becomes tuned to a received signal, whereby said tuning motor is stopped and whereby said audio output stage is rendered conductive only after a delay sufficient to allow the transient responses of said receiver to subside.

13. In a signal seeking radio receiver, a seeking switch, a tuning motor, a relay, a switch actuated by a first state of energization of said relay to start said tuning motor and actuated by a second state of energization of said relay to stop said motor, a control tube for said relay, said control tube having a control grid, means connecting said relay in the output circuit of said control tube whereby said relay is placed in said first state of energization only when said control tube is in a conducting state, a source of supply voltage, means including said seeking switch connecting said relay to the terminals of said source whereby said relay is placed in said first state of energization when said seeking switch is actuated, means operated by the actuation of said seeking switch to render said control tube conductive, a second tube having a plate and an output circuit, means connecting said output circuit to the grid of said control tube whereby said relay control tube may conduct except when the plate voltage of said second tube is falling in excess of a predetermined rate and reaches a predetermined amplitude, means connecting said grid to a reference voltage plane, the last named means including a resistor, means applying voltages from the signal translation channel of said receiver to said second tube in a manner to render it increasingly conductive only when said receiver is tuned substantially to resonance with a received signal, means including a resistor and said relay operated switch connecting said source to the plate of said second tube, the last named connection being made only when said relay is in said first state of energization, and a capacitor connected between the junction of said switch and said plate to said voltage reference plane, whereby the plate voltage of said second tube may be caused to decline in excess of said predetermined rate following the actuation of said seeking switch only after a delay sufficient to allow said tuning motor to detune said receiver from resonance with any signal to which it may have been tuned when said seeking switch was actuated.

14. In a signal seeking radio receiver, a tuning motor having a field coil, a source of direct current voltage, a source of alternating current voltage, an audio output amplifier having a plate circuit, means connecting one terminal of said field coil to said plate circuit, a capacitor coupling said one terminal to a voltage reference plane, a switching means having a first position and a second position, means connecting the remaining terminal of said field coil to said switching means, said switching means when in said first position connecting said remaining terminal to said direct current voltage source, said switching means when in said second position connecting said remaining terminal to said alternating current voltage source and a capacitor connected across said source of direct current voltage to said voltage reference plane.

References Cited in the file of this patent

UNITED STATES PATENTS

| | | |
|---|---|---|
| 2,056,200 | Lowell | Oct. 6, 1936 |
| 2,326,737 | Andrews | Aug. 17, 1943 |
| 2,546,987 | Eannarino | Apr. 3, 1951 |
| 2,639,372 | Colgan | May 19, 1953 |
| 2,639,374 | Goodrich | May 19, 1953 |
| 2,679,589 | Mack | May 25, 1954 |
| 2,731,556 | Wiley | Jan. 17, 1956 |
| 2,743,797 | Whitaker | May 1, 1956 |

OTHER REFERENCES

Ghirardi: Radio Physics Course, 2nd edition, Radio Technical Publishing Co., 1933 (page 751 relied on).